United States Patent [19]
Kurdziel et al.

[11] Patent Number: 6,108,421
[45] Date of Patent: Aug. 22, 2000

[54] METHOD AND APPARATUS FOR DATA ENCRYPTION

[75] Inventors: Michael Thomas Kurdziel; Robert Paul Clements, both of Rochester, N.Y.

[73] Assignee: Harris Corporation, Melbourne, Fla.

[21] Appl. No.: 09/035,765

[22] Filed: Mar. 6, 1998

[51] Int. Cl.[7] .............................. H04K 1/00; H04L 9/00
[52] U.S. Cl. .............................. 380/28; 380/259; 380/37
[58] Field of Search ................................ 380/28, 29, 37, 380/241

[56] References Cited

U.S. PATENT DOCUMENTS

| | | | |
|---|---|---|---|
| 4,658,094 | 4/1987 | Clark | 380/28 |
| 4,751,733 | 6/1988 | Delayaye et al. | 380/42 |
| 5,054,067 | 10/1991 | Moroney et al. | |
| 5,214,703 | 5/1993 | Massey et al. | |
| 5,231,662 | 7/1993 | van Rumpt et al. | 380/9 |
| 5,317,638 | 5/1994 | Kao et al. | |
| 5,381,480 | 1/1995 | Butter et al. | 380/37 |
| 5,511,123 | 4/1996 | Adams . | |
| 5,517,614 | 5/1996 | Tajima et al. | |
| 5,745,577 | 4/1998 | Leech | 380/28 |
| 5,838,796 | 11/1998 | Mittenthal | 380/28 |

OTHER PUBLICATIONS

Menezes, et al., *Handbook of Applied Cryptography*, pp. 252–256, 259–271, 599–606, 1997 Boca Raton, Florida.

Schneier, *Applied Cryptography* 2nd Ed., Chapters 13 and 14, 1996, printed from http://corpitk.earthweb.com/reference/dir.security1.html [internet].

*Primary Examiner*—Tod R. Swann
*Assistant Examiner*—Stephen Kabakoff
*Attorney, Agent, or Firm*—Rogers & Killeen

[57] ABSTRACT

A method and apparatus for use in encrypting and decrypting digital communications converting an initial block to final block based on freely selectable control information and secret key information. The apparatus or method having a plurality of units or steps operating on plain text or cipher text to provide a final block. The steps or methods including three modulo operations having unique modulus and meeting a specified constraint.

27 Claims, 5 Drawing Sheets

METHOD AND APPARATUS FOR DATA ENCRYPTION

BACKGROUND OF THE INVENTION

The invention is directed to encrypting and decrypting blocks of digital data, more specifically, to a cipher method and device for the block-by-block conversion of a first digital block into a second digital block using at least one freely selectable control block.

The rapidly growing use of digital communication systems in commerce has spurred the need for cryptographic systems which are secure against popular "cryptoanalysis" or cracking techniques at least for a sufficient length of time. Prior art systems such as Massey, et al. U.S. Pat. No. 5,214,703 use a block cipher device which is suitable both for the encryption of plain text blocks and for the decryption of ciphertext blocks. However, prior art systems cannot be designed with any input/output size by appropriately scaling the size of system operations and are susceptible to existing cracking techniques. In addition, use of this cryptographic apparatus guarantees that any communications equipment will be interoperable only if all are using this same cryptographic apparatus.

Accordingly, it is an object of the present invention to provide a novel scaleable block cipher device.

It is another object of the present invention to provide a novel block cipher device which overcomes the disadvantages of the prior art.

It is yet another object of the present invention to provide a novel method of converting an initial block to a final block for use in encrypting and decrypting digital communications.

It is still another object of the present invention to provide a novel block cipher device having multiple stages which is suitable for encrypting and decrypting digital information.

It is a further object of the present invention to provide a novel method for use in encrypting and decrypting information which minimizes the possibility of signal interception.

It is yet a further object of the present invention to provide a novel block cipher device which is scaleable and customizable.

It is still a further object of the present invention to provide a novel block cipher device which is not vulnerable to standard cryptanalysis techniques.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 4:
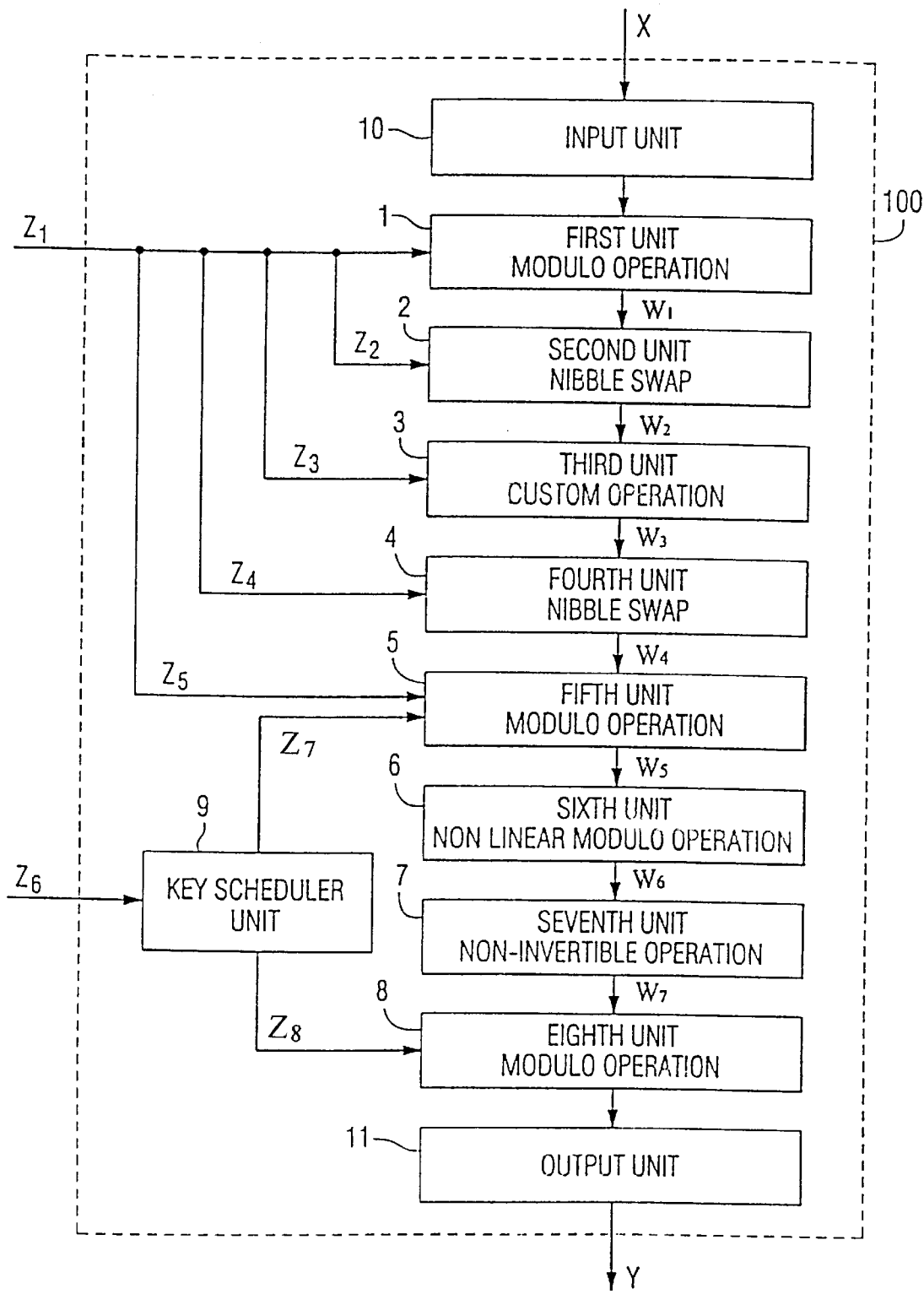
FIG. 4 is a block diagram of a block cipher device according to the present invention.

With reference now to FIG. 4, a block cipher device 100 is non-recursive and may include an input unit 10, eight units 1–8, an output unit 11, and a key scheduling unit 9.

The input unit 10 and output unit 11 assemble and buffer input and output data to and from the block cipher device 100. The structure of the input unit 10 and output unit 11 generally depends on an application (e.g., serial or parallel). The input unit 10 and output unit 11 are not unique to the block cipher device 100.

The block cipher device receives three input variables, X, $Z_1$, and $Z_6$ and produces an output variable, Y. X is the primary traffic input to the block cipher device 100 and Y is the primary traffic output. $Z_1$ and $Z_6$ may be externally applied variables. $Z_6$ may be a secret "Key" variable which is input to the block cipher device 100 via a secure channel (e.g., a courier with sealed cover) prior to encryption or decryption. $Z_1$ (or "customer algorithm modification" variable) and subunits of $Z_1$ (i.e., $Z_2$, $Z_3$, $Z_4$, and $Z_5$) are operated on in the first, second, third, fourth, and fifth units 1, 2, 3, 4, and 5 of the block cipher device 100. The output Y of the block cipher device 100 is a unique function of the primary traffic X, the Key variable $Z_6$ and the variable $Z_1$.

The first, fifth, sixth, and eighth units 1, 5, 6, and 8 may consist primarily of modular arithmetic logic gates. The seventh unit 7 performs a non-invertible operation (for example, a mid transform). Units 2 and 4 perform "nibble swapping." The third unit 3 provides a custom operation substituting or expanding a block based on $Z_3$. The key scheduling unit 9 receives an externally applied input variable, $Z_6$, and deterministically generates two pseudo random key blocks, $Z_7$ and $z_8$. The key blocks $Z_7$ and $Z_8$ are used as operands in the fifth unit 5 and the eighth unit 8, respectively.

To facilitate the description, FIGS. 1, 2, 3, and 5 illustrate 64 bit block implementations. 64 bit blocks are used only as an example. Generally, in 64 bit block implementations, each unit includes at least a 64 bit input/output space. A block cipher device of the present invention having any input or output size can be designed by appropriately scaling the size of block cipher device operations.

Figure 5:
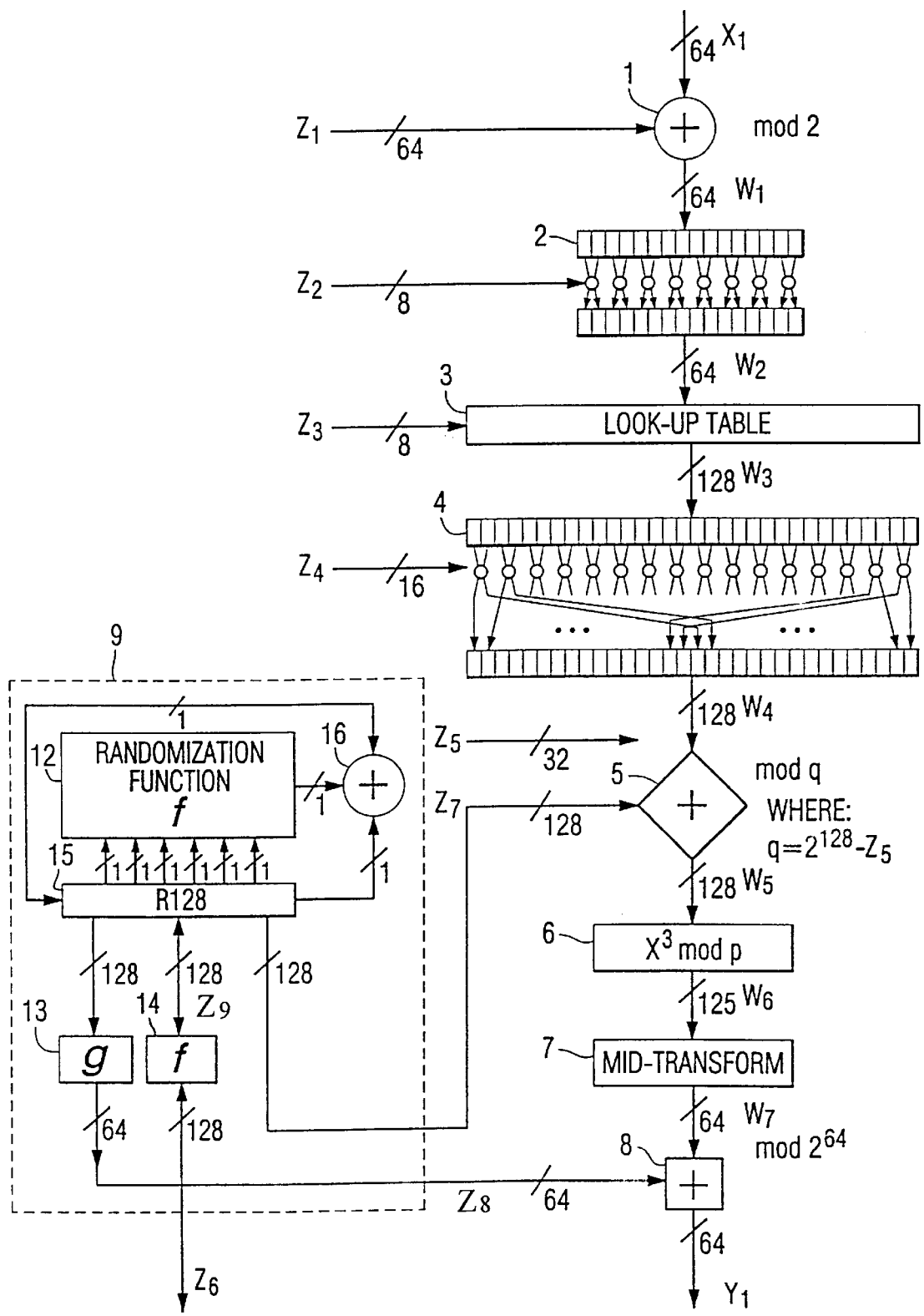
FIG. 5 is a schematic representation of the block cipher device shown in FIG. 4.

With reference now to FIG. 5, the first unit 1 performs a modulo 2 addition (Exclusive-Or) on primary traffic input X with variable $Z_1$ resulting in first unit 1 output $W_1$.

The second unit 2 performs a nibble swap operation. The second unit 2 segments $W_1$ into 8 pairs of nibbles; each nibble holding 4 bits. The second unit 2 transposes each segment based on $Z_2$ (e.g., bits 0–7 of $Z_1$) resulting in second unit 2 output $W_2$. For example, when the value of bit "0" in $Z_2$ is equal to binary "1" then the order of the nibbles pair "0" will be transposed. Likewise, if bit "0" in $Z_2$ is equal to binary "0" then the order is left unchanged. The order of each nibble pair will be determined by the value of the corresponding bit in $Z_2$. The value of bit 0 controls the order of nibble pair 0, the value of bit 1 the order of nibble pair 1 continuing through to bit 7 which controls the order of nibble pair 7.

The third unit 3 is a custom unit providing a custom substitution and expansion operation. The custom operation with inputs $W_2$ and $Z_3$ and output $W_3$ may be inserted into the block cipher device 100 in the form of a look-up table. $Z_3$ may be bits 24 through 31 of $Z_1$. Providing a custom unit allows unique system variants to be designed and provided while meeting the requirements of secure cipher design. For example, the customized substitution or expansion operation of a look-up table is only disclosed to intended end users.

The fourth unit 4 may be another nibble swap operation where $W_3$ is segmented into 16 nibbles. $Z_4$ (for example, bits 24 through 31 of $Z_1$) controls the re-ordering of $W_3$ in a slightly different manner than explained for the second unit 2. For example, when the value of bit "8" in $Z_4$ is equal to a binary "0" then the first nibble in the pair will be written to the first position in the high order segment of $W_4$ and the second nibble will be written to the first position in the low order segment of $W_4$. When the value of bit "8" in $Z_4$ is equal to a binary "1" then the two nibbles will be transposed before being written to $W_4$. As with the second unit 2, the re-ordering of each nibble pair will be determined by a corresponding bit in $Z_4$.

The fifth unit 5 performs a modulo addition operation. $W_4$ and $Z_7$ are operands of the fifth unit 5. $W_4$ is the output of the fourth unit 4 and $Z_7$ is an output from the key scheduler unit 9. The modulus q of the operation is determined using $Z_5$ by the following relation:

$$q=2^{128}-Z_5 \qquad \text{(equ. 1)}$$

$Z_5$ may be bits 33 through 64 of $Z_1$. The sixth unit 6 performs a modular cubing operation. In other words, $W_5$ is raised to the third power modulo p and the result is designated as $W_6$. The modulus p is determined by the following relation:

$$p=2^{125}-X \qquad \text{(equ. 2)}$$

The variable X is chosen such that the greatest common denominator between the order of the operation "3" and (p−1) is equal to 1. This is captures in the following equation:

$$GCD(3, p-1)=1 \qquad \text{(equ. 3)}$$

The seventh unit 7 performs a non-invertible operation such as an operation known as a mid transform. The input to the operation, $W_6$, is 128 bits in length and the output of the operation, $W_7$, is 64 bits in length. The mid transform simply maps bits 64 bits of the input to a 64 bit output. For example, the mid transform may map bits 30 through 93 of $W_6$ to bits 0 through 63 of $W_7$. The rest of the bits in $W_6$ are discarded.

The eighth unit 8 performs another modulo addition operation. $W_7$ and $Z_8$ are operands of this unit. $W_7$ is an output from the seventh unit 7 and $Z_8$ is an output from the Key Scheduler 9. The modulus of the operation is chosen as $2^{64}$. The output of this stage is the output of the block cipher device and is designated as $Y_1$.

Although specific values are specified for moduli of the first, fifth, sixth, and eighth units 1, 5, 6, and 8, the objective of the block cipher device will be satisfied by a range of choices. It is required, however, that the constraint of equ. 3 be satisfied and that a unique modulus be used in each stage. The "modulo" units 1, 5, 6, and 8 along with "non-invertible" unit 7 are not segmentable into a set of lower level operations.

The key scheduler unit 9 comprises a first function unit 12, a second function unit 13, a third function unit 14, shift register 15 and a mod 2 add logic gate 16.

The key scheduler unit 9 processes key variable $Z_6$ to produce variable $Z_7$ and $Z_8$. $Z_7$ and $Z_8$ are used during the block cipher device operation. $Z_9$ is an output of the third function unit 14 and is stored in the shift register 15. The third function unit 14 may be a deterministic function operating on $Z_6$. The contents of the shift register are shifted to the right one bit at a time until its content have been completely recirculated. With each shift, the least significant bit in shift register 15 is mod 2 added to the output of first function unit 12. The result being moved into the most significant bit position of the shift register 15. When the contents of the shift register 15 have been completely processed, the shift register is output as $Z_7$. $Z_7$ is input to the second function unit 13 to produce $Z_8$.

The first function unit 12 may be a custom look-up table mapping, for example, six one bit inputs to a single one bit output. Each of the inputs to the first function unit 12 is a tap connected to an individual bit position in the shift register 15. The tap locations may be arbitrarily chosen with the following constraint: no tap can be connected to either the least significant or to the most significant bit positions of the shift register 15. The first function unit 12 must meet secure design. For example, a design for the first function unit may be customized and disclosed only to an intended end user.

The second function unit 13 performs a bit-wise mod 2 sum without carry of the higher and lower order halves of $Z_7$ to produce $Z_8$. The third function unit 14 performs a bit-wise mod 2 sum without carry of variable $Z_6$ and a custom bit pattern of equal length to produce variable $Z_9$. The custom bit pattern is disclosed only to an intended end user.

When required, the value of the original key variable $Z_6$ may be recovered by first reloading $Z_7$ into shift register 15. Shift register 15 is then shifted to the left one bit a time until its content have been completely recirculated. With each shift, the most significant bit in the shift register 15 is mod 2 summed to the output of the first function unit 12. The result is moved into the least significant bit position of shift register 15. When the contents of shift register 15 have been completely processed, it is input to third function unit 14. In the third function unit 14, the custom bit pattern is bit-wise mod 2 summed to reproduce $Z_6$.

The block cipher device may be operated in various modes such as a self-synchronizing cipher feedback mode (SSCFB), a minimum error propagation (or counter) mode (MEP), or a block cipher feedback mode (BCFB).

Figure 1:
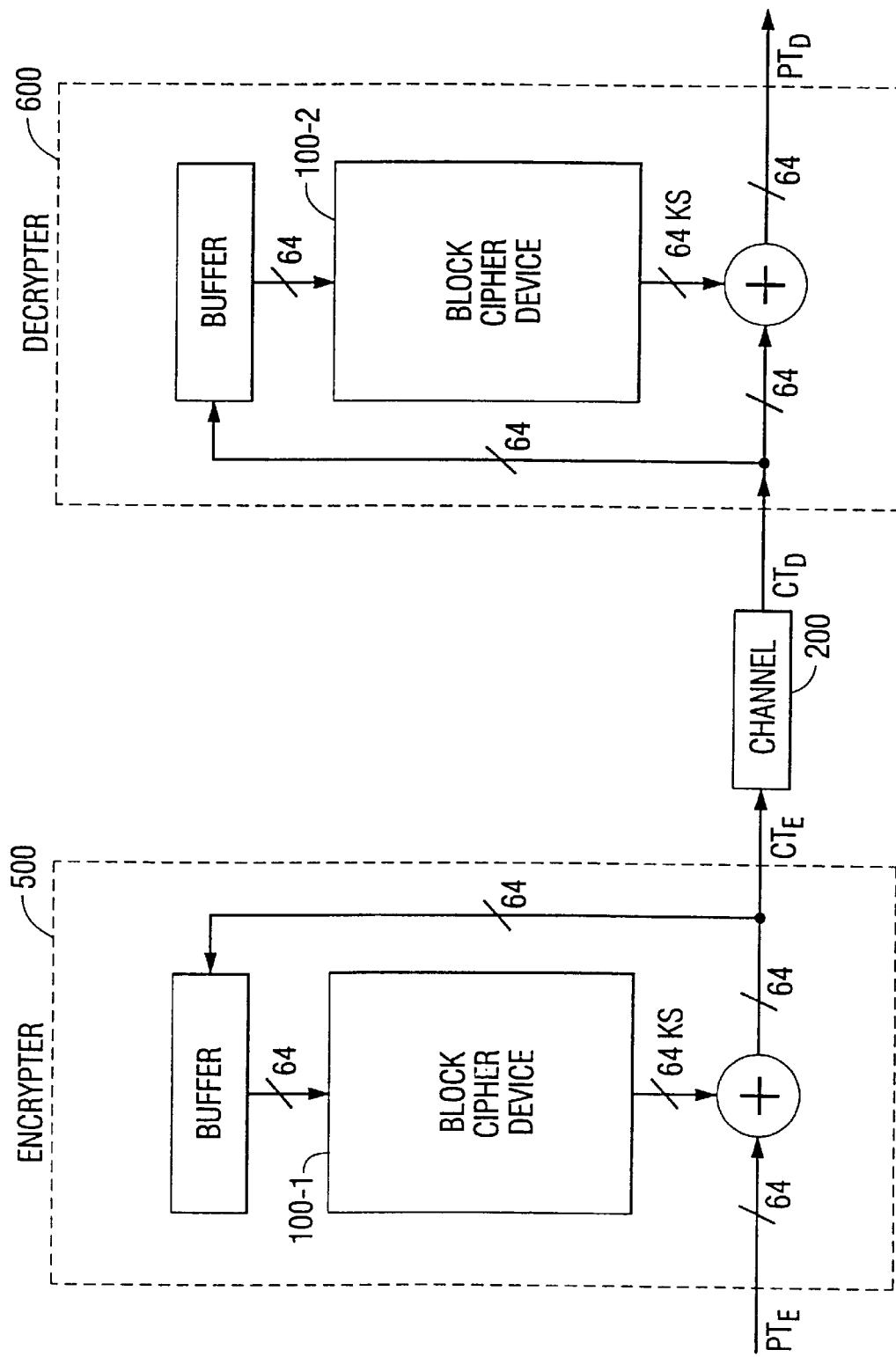
FIG. 1 is a schematic representation of a communication system operating in block cipher feedback mode using a block cipher device according to the present. invention.

With reference now to FIG. 1 illustrating a BCFB mode, a block of unencrypted data or "Plain Text" (PT) is applied to the input of the encrypter 500 labeled $PT_E$. PTE is then modulo 2 added to a block of "Key Stream" KS. KS represents the output of the block cipher device 100-1. CT represents the resulting block (i.e., cipher text). CT is output at the port labeled $CT_E$ and is then transmitted over a channel 200. In the next iteration, CT is fed back as input to the block cipher device 100-1. The block cipher device processes the fed back block to produce a new block of KS. KS is then combined with the next block of PT and the encryption process continues. At the decrypter 600, received CT is represented by $CT_D$. $CT_D$ is combined with a block of KS to produce as output a block of recovered plain text $PT_D$. The $CT_D$ block is simultaneously applied to the input of the block cipher device 100-2. The block cipher device 100-2 uses the $CT_D$ block as input to produce another block of KS. This KS block is used to process the next block of $CT_D$. This mode is intended for relatively error free communication channels.

Figure 2:
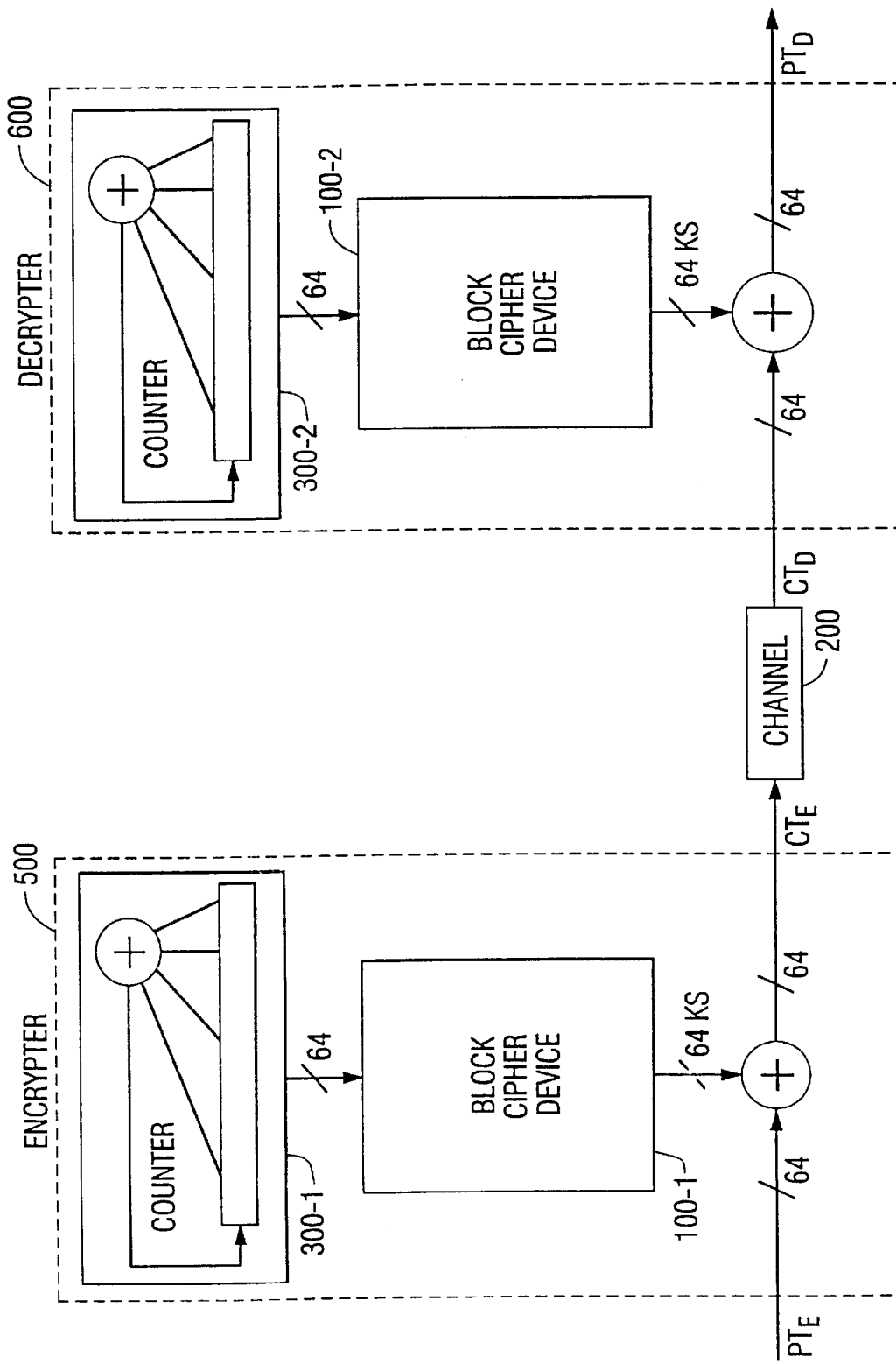
FIG. 2 is a schematic representation communication system operating in minimum error propagation mode using a block cipher device according to the present invention.

With reference now to FIG. 2 illustrating a MEP mode, unencrypted data or "Plain Text" PT is applied to the input of the encrypter 500 labeled $PT_E$. $PT_E$ is then modulo 2 added to a block of KS to produce a block of cipher text. CT is output at a port labeled $CT_E$ and is then transmitted over the channel 200. For a next iteration, encrypter counter 300-1 is incremented and the output of the counter 300-1 is input to the block cipher device 100-1. The block cipher device 100-1 processes to produce a new block of KS. The new block of KS is then combined with the next block of PT and the encryption process continues. At the decrypter 600, received CT is represented by $CT_D$. $CT_D$ is combined with a block of KS to produce as output a block of recovered plain text $PT_D$ and decrypter counter 300-2 is incremented. The block cipher device 100-2 uses the output of the counter to produce another block of KS. This KS block is used to process the next block of $CT_D$. This mode is intended for noisy or error prone communication channels. A toggled bit error on the channel will likely result in only a one bit error on $PT_D$. In other words, in this mode the cryptographic system will likely have only one bit of error extension.

Figure 3:
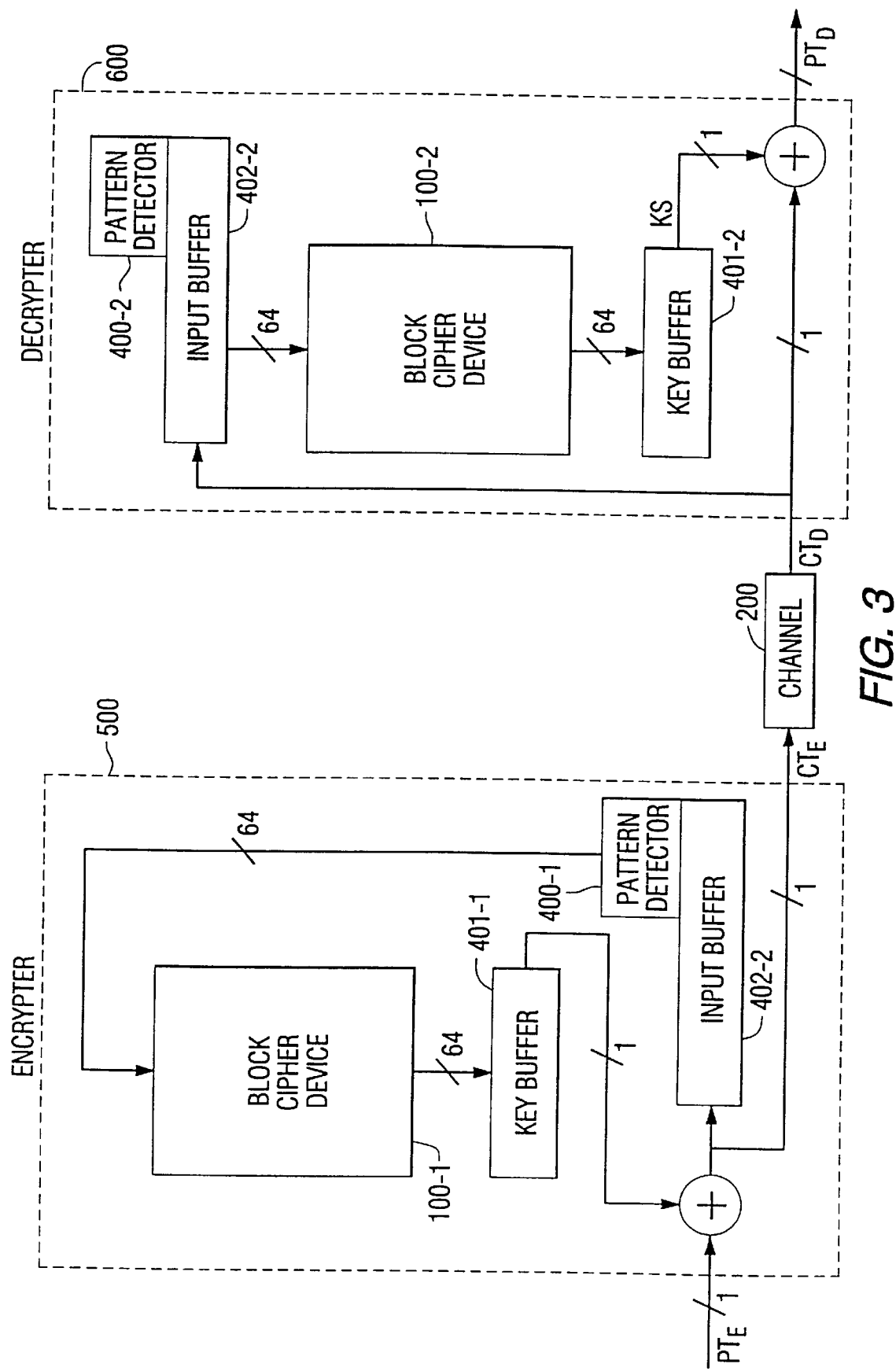
FIG. 3 is a schematic representation of a communication system operating in self-synchronizing cipher feedback mode using a block cipher device according to the present invention.

With reference now to FIG. 3 illustrating a SSCFB mode, unencrypted data or "Plain Text" (PT) is applied one bit at time to the input labeled $PT_E$. Each $PT_E$ bit is modulo 2 added to a bit of KS to produce a bit of cipher text CT. Encryption continues until another iteration is initiated. Another iteration may begin when either the entire block of KS is consumed or when the pattern detector 400-1 is triggered. The pattern detector 400-1 continually monitors CT for a specific bit sequence and when the sequence is detected a new iteration is triggered. Because CT appears statistically random, this mechanism will initiate a new iteration at pseudo-random intervals. When a new iteration is initiated, all remaining KS is purged from the key buffer 401-1 and the most recent bit block of CT, $CT_E$, is input to the block cipher device 100-1. The block cipher device 100-1 uses the most recent block as input to produce another block of KS. The new block of KS is stored in the key buffer 401-1 and is used to continue the encryption process. At the decrypter 600, the received CT is applied one bit at time to input labeled $CT_D$. Each $CT_D$ bit is modulo 2 added with a bit of KS to produce a bit of recovered "Plain Text" as output $PT_D$. The CT bit stream is simultaneously applied to the input buffer 402-2 (CB1) of the block cipher device 100-2. When either the input buffer 402-2 becomes full or the pattern detector 400-1 triggers, the following will occur:

1) the key buffer 401-2 is purged;
2) the most recent block of CT, $CT_E$, is input to the block cipher device 100-2;
3) the block cipher device uses the most recent block of CT to produce a new block of KS; and
4) the new block of KS is stored in the key buffer 401-2.

The block cipher device 100-2 continues processing and $CT_D$ continues to be shifted into input buffer 402-2 until another iteration is initiated. This mode is intended for communication channels that are subject to synchronization errors. In this mode, a communication system will be able to automatically recover from loss cryptographic and block boundary synchronization.

To operate in any of the modes shown in FIGS. 1–3, the encrypter 500 and the decrypter 600 must first be initialized such that their internal states are all identical. Initialization may be obtained using an initialization vector "IV" which is generated on the encrypter side and is used to initialize all internal states of the encrypter. The IV is then transmitted over the channel 200 to the decrypter 600. Using the IV, all internal states of the decrypter 600 are initialized to the same values.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A block cipher device for use in encrypting and decrypting information in a cryptographically secured digital communication system comprising:
    (a) a first stage adapted to receive an input data block and a control data block, said first stage comprising:
        (i) a plurality of serially connected units including a sum modulo-two unit responsive to the input data block and a first subset of the control data block, and
        (ii) a first nibble swap unit responsive to the output signal from said sum modulo-two unit and a second subset of the control data block for reordering the output signal from said sum modulo-two unit;
    (b) a key scheduler responsive to a key data block including means for randomizing the key data block; and
    (c) a second stage adapted to receive the randomized key data block from said key scheduler in first and second key data sub-blocks, the control data block and the output signal from said first stage, said second stage comprising a plurality of serially connected units including:
        (i) a first linear modulo unit responsive to said first key data sub-block from the key scheduler, the output signal from said first stage, and the control data block for performing a modulo summing operation based on a first modulus q,
        (ii) an $n^{th}$ power modulo unit responsive to the output signal from said first linear modulo unit for performing an $n^{th}$ power modulo operation based on a second modulus p to thereby provide an output signal of predetermined size, with n>1 and with $p=2^K-X$ where X is selected such that the greatest common denominator between n and ($2^K-X-1$) is one and K is said predetermined size, and
        (iii) a second linear modulo unit responsive to the second key data sub-block and the output signal from said $n^{th}$ power modulo unit for performing a modulo summing operation based on a third modulus r,
    said first, second, and third modulus p, q and r respectively being unique from each other.

2. The block cipher device of claim 1 wherein one of the plurality of serially connected units of said first stage is a substitution unit responsive to the output signal from the first nibble swap unit and a third subset of the control data block to provide customizable cipher variations.

3. The block cipher device of claim 2 wherein one of the plurality of serially connected units of said first stage is a second nibble swap unit responsive to a fourth subset of the control data block and the output signal from said substitution unit for reordering the output signal from said substitution unit.

4. The block cipher device of claim 1 wherein said first nibble swap unit reorders the output signal from said sum modulo-sum unit as a function of the second subset of the control data block.

5. The block cipher device of claim 1 wherein said means for randomizing includes a selectively customized look-up table.

6. The block cipher device of claim 1 wherein said key scheduler also includes a shift register responsive to the key data block.

7. The block cipher device of claim 6 wherein said means for randomizing is responsive to said shift register.

8. The block cipher device of claim 7 wherein the key scheduler comprises a combiner responsive to serial output from the shift register and serial output from the look-up table, the combiner serially combining the serial output from the shift register and the serial output from the look-up table using a modulo two summing operation, and the combiner adapted to provide a combined data output.

9. The block cipher device of claim 8 wherein the key scheduler comprises a path between the combiner and the shift register allowing the combined output to be stored in the shift register.

10. The block cipher device of claim 9 wherein the first key data block is derived from the contents of the shift register.

11. The block cipher device of claim 10 wherein the second key data block is derived from the contents of the shift register using a modulo-two summing operation.

12. The block cipher device of claim 1 wherein the first modulus is based on a fifth subset of the control data block.

13. The block cipher device of claim 1 wherein the plurality of serially connected units of the second stage includes a non-invertible operation unit responsive to the output signal from the $n^{th}$ power modulo unit, the non-invertible operation unit having a structure for discarding a portion of the output from the $n^{th}$ power modulo unit.

14. The block cipher device of claim 13 wherein the non-invertible operation unit provides an input for the second linear modulo unit.

15. A method for converting an initial data block into a final data block for use in encrypting and decrypting information in a communication system comprising the steps of:

(a) providing an initial data block, a control data block, a first key data block and a second key data block;

(b) combining the initial data block and the control data block to provide a first data output signal;

(c) transposing segments of the first data output signal responsively to a first subset of the control data block to provide a second data output signal;

(d) expanding the second data output signal responsively to a third subset of the control data block to provide a third data output signal;

(e) re-ordering the third data output signal responsively to a fourth subset of the control data block to provide a fourth data output signal;

(f) combining the fourth data output signal with a first key data block to provide a fifth data output signal;

(g) performing an $n^{th}$ power modulo operation using the fifth data output signal to provide a sixth data output signal;

(h) combining a preselected portion of the sixth data output signal with a second key data block to provide a final data block.

16. The method of claim 15 wherein the first key data block and second key data block are derived from a common key data block by the steps of:

(a) storing the key data block in a shift register;

(b) providing a look-up table having a path to the shift register for modifying the contents of the look-up table;

(c) serially queuing out and combining the content of the shift register and the content of the look-up table to provide a key scheduler output;

(d) storing the key scheduler output in the shift register; and (e) repeating the steps of serially queuing out and combining, and storing the key scheduler.

17. The method of claim 16 wherein the look-up table is customizable.

18. The method of claim 17 wherein the first key data block at any point in time is a function of the shift register at that point in time.

19. The method of claim 18 wherein the second key data block at any point in time is a function of the modulo-two sum of the key scheduler output stored in the shift register at that point in time.

20. The method of claim 15 wherein n is greater than one.

21. The method of claim 20 wherein step (h) includes the step of performing a modulo operation based on a modulus r.

22. The method of claim 21 wherein the $n^{th}$ power modulo unit uses a modulus p which is unique from the modulus r.

23. The method of claim 22 wherein the modulus q is a function of a fifth subset of the control data block.

24. The method of claim 22 wherein the modulus $p=2^K-X$ with X selected so that the greatest common denominator between n and (p−1) is equal to 1 and K is the size of the sixth output signal.

25. The method of claim 15 wherein step (f) includes the step of performing a modulo operation based on the modulus q.

26. The method of claim 22 wherein step (f) includes the step of performing a modulo operation based on the modulus q.

27. The method of claim 26 wherein modulus q is unique from the modulus p and the modulus r.

* * * * *